May 23, 1972        D. H. HILLE        3,664,679
STABILIZING DEVICE FOR TRUCKS
Filed Jan. 22, 1970        2 Sheets-Sheet 1
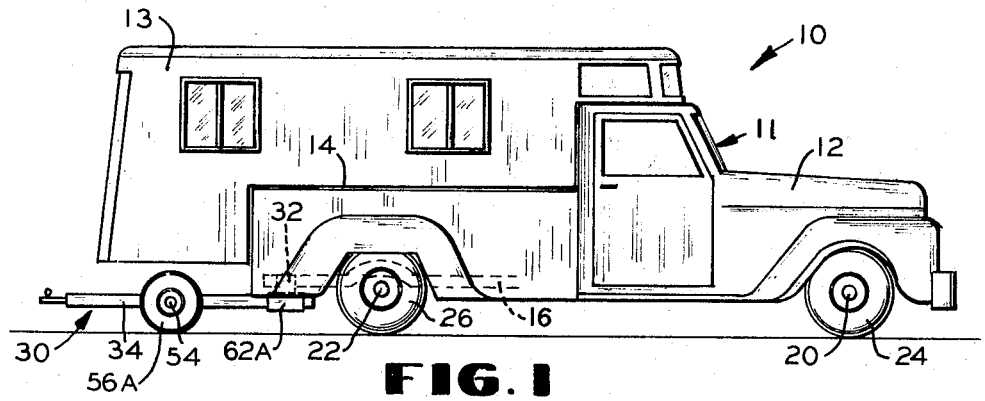
FIG. 1
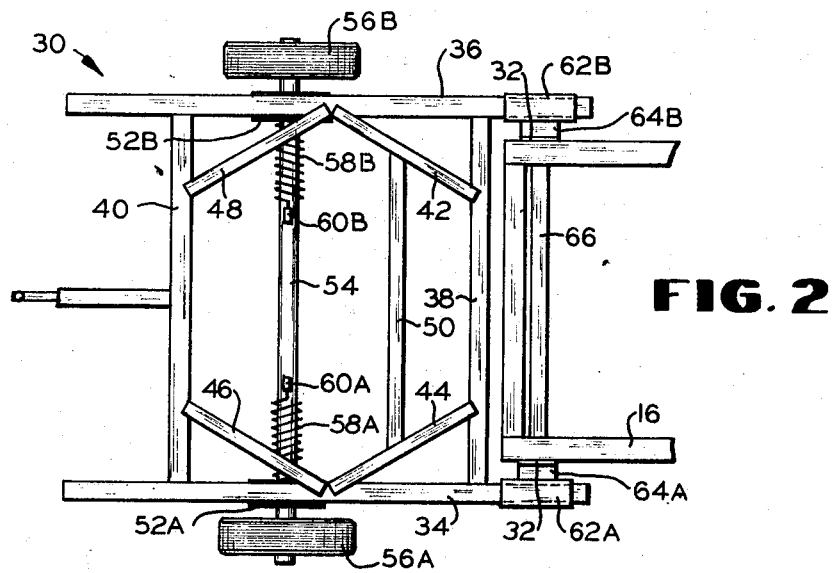
FIG. 2
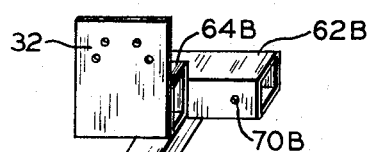
FIG. 5
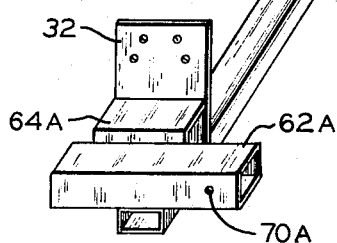
INVENTOR.
DALE H. HILLE
BY *George R. Royer*
ATTORNEY

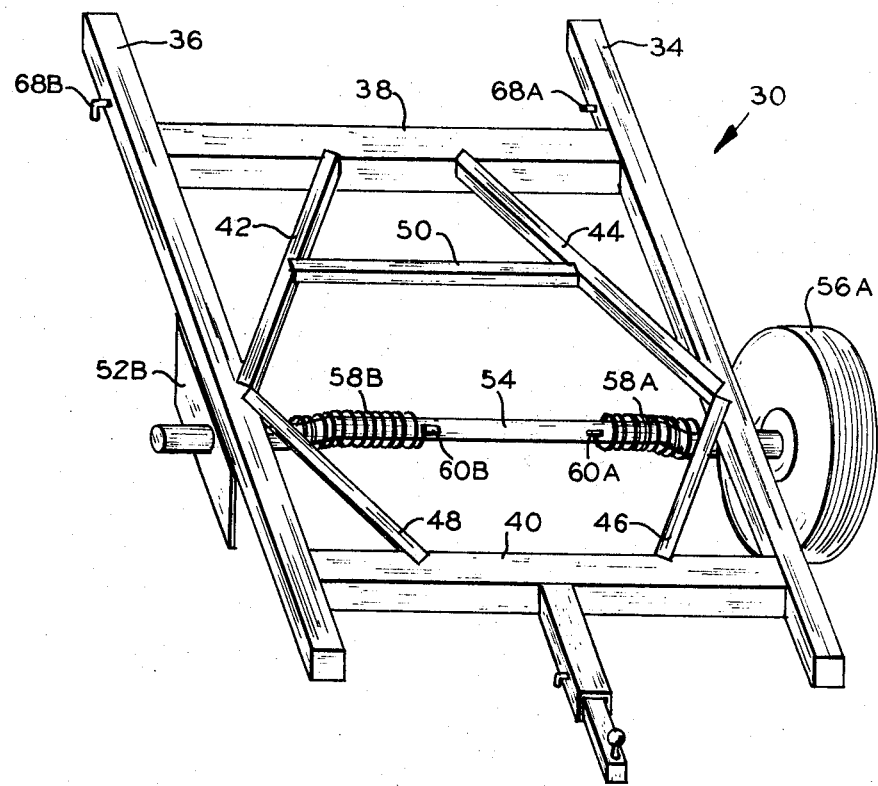
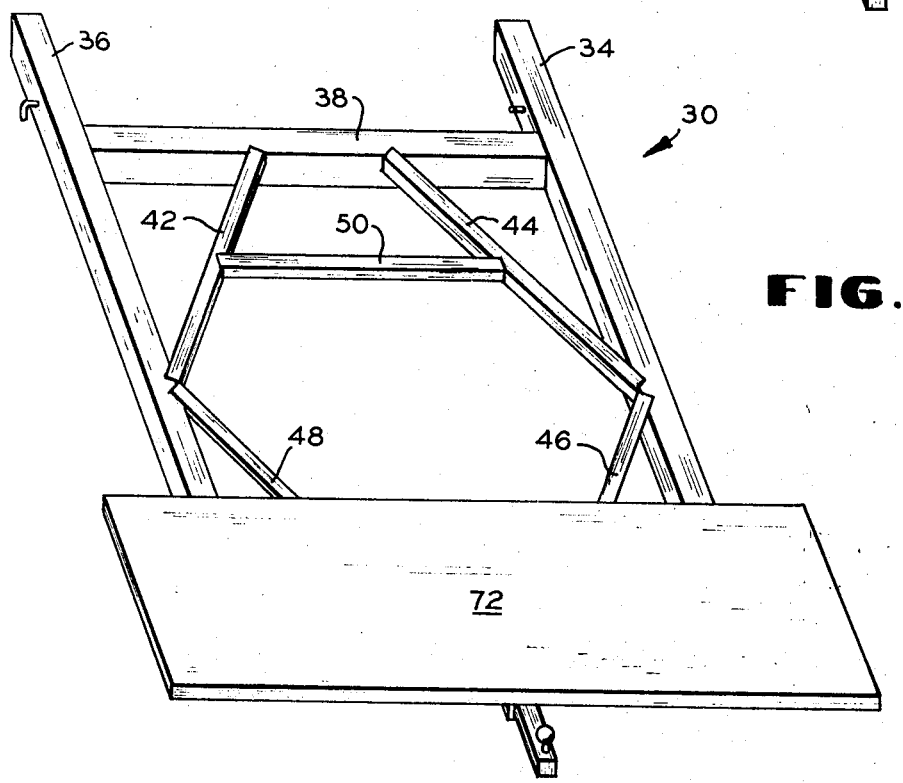

United States Patent Office 3,664,679
Patented May 23, 1972

3,664,679
STABILIZING DEVICE FOR TRUCKS
Dale H. Hille, Bowling Green, Ohio, assignor to Dale H.
Hille Company, Bowling Green, Ohio
Filed Jan. 22, 1970, Ser. No. 4,850
Int. Cl. B60p 3/40
U.S. Cl. 280—81 R    4 Claims

ABSTRACT OF THE DISCLOSURE

A stabilizing device for a truck which is a supplemental frame extension supported on wheels and attached, in combination, with the rearward portion of the main frame of the truck so as to be a rearwardly extending addition to the main frame of the truck, this supplemental frame extension being positioned beneath the load carrying surface of the truck as a stabilizer and additional weight bearer.

BACKGROUND OF THE INVENTION (A) Field of the invention

This invention pertains to motor vehicles of the category designed to carry loads of various sizes on a load-bearing surface positioned on the rearwardly extending portion of the vehicle. In particular, this invention relates to trucks which carry unevenly distributed or unbalanced loads, for which type of loading the truck is not designed or constructed to carry under normal operating conditions. More specifically, the subject invention is most effectively adapted to those trucks which carry proportionately heavier and unstable loads on the most rearward portion of the truck, as seen in certain camper vehicles.

(B) Description of the prior art

The prior art discloses trailers which are connected cooperatively with tractors in an articulated manner. Also known in the prior art are truck-trailer units which are constructed as a single nonarticulated unit, but which can be readily separated into the truck and trailer as independent units. An example of this type of unit is the separable camper-truck which is used substantially on today's highways. Camper-trucks of this type are constructed as readily separable units, wherein the camper body and the truck can be joined together for travelling and then disconnected to allow the camper to stand independently. In this type, the rearwardly positioned camper body is adapted to be fixed or somehow anchored at a stationary position, after the truck is disconnected and moved away from the camper body. An example of such separable camper-truck unit is seen in the Le Voyer patent (U.S. Pat. No. 2,000,619).

In addition to the separable camper-truck arrangement a common practice in the camper-truck field is to mount a camper body in a permanent or semi-permanent manner on the rear load-bearing portion of a small truck. Camper-trucks of this type can be constructed to be separable into independent self-standing units, however, this type of camper body is not adapted to sit independently on a set of wheels. Generally, when a camper body is attached to a small truck in such an arrangement, it results in an uneven weight distribution problem. This problem results to a large extent from the fact that the camper body places a disproportionate amount of weight on the rear axles of the supporting truck. This problem is further complicated by the fact that this heavy weight load of the camper body is concentrated to a large degree rearwardly of the back axle of the truck. Additionally, a significant portion of the camper body weight protrudes beyond the lateral extent of the wheels on the truck rear axle, further aggravating the problem. The resultant effect of such an unbalanced load distribution is the displacement or movement of the center of gravity and the moment of inertia of the camper-truck toward, and sometimes rearwardly, of the rear axle of the truck, to a position of instability. This instability causes several operating problems, for example, interference with the braking ability of the truck because of road sway. Other obvious driving hazards are created because of these instability characteristics.

Certain modifications and inventions have been advanced to compensate for the instabilities created by the permanent or semi-permanent mounting of camper bodies to pick-up or similar trucks. One common device has been the use of a third set of wheels on an axle mounted and located beneath that part of the truck bearing the camper body just rearwardly of the conventional rear axle on the truck. This third set of wheels is generally rotatably mounted on a rectangular supplementary frame which is fixed either to the bottom of the camper body or to the truck body itself. These compensating modifications have been in turn comprised of two types. One such type has been comprised of an arrangement of multiple frame parts which are structured together in a wheeled frame unit which can be fixed to the bottom of the rear portion of the camper body, which is semipermanently set on the load-bearing surface of the truck. In this latter arrangement, the intent is to separate the camper body away from the truck at various intervals, with this frame and wheel unit serving as an independent support. On the other hand, there is a unitary frame type of support in which a single supplementary frame unit is fixed directly to the underbelly of the truck with some type of permanent or semi-permanent fixtures connecting this frame unit directly to both the underbelly of the load-bearing surface of the truck body and the main truck frame. This type of weight compensating device has been used generally for trucks having camper bodies which are semi-permanently fixed thereto; however, this type of compensating device has been somewhat undesirable because of the structural fatigue on the metal supports caused by road bumps and undulations being transmitted directly from the wheels mounted on the supplementary frame, through the supplementary frame, to the load-bearing surface of the truck or camper body. Furthermore, since these vibrations are transmitted directly to the camper body, it yields a fairly rough ride for those riding in the camper body, because of this rigidity of the support. The permanent support arrangement with direct vertical connections to the camper eliminates the instability problem, however, the problem may become one of overstability with the resultant structural fatigue and roughness of ride, as discussed. In addition, it is undesirable to have the vertical weight support concentrated at the most rearward portion of the camper body. It is this field where the camper body is supported by a suplementary frame that this invention is directed.

Therefore, in view of the problems in the prior art, it is an object of this invention to provide an improved stabilizing device for trucks;

It is also an object of this invention to provide a safety device for trucks carrying disproportionately distributed weight loads;

It is another object of this invention to provide an improved stabilizing device for trucks having camper bodies mounted thereon;

It is still another object of this invention to provide means for improving the stability of motor vehicles having a moment of inertia situated at a hazardous position;

It is yet another object of this invention to provide means for equalizing the weight loading on a truck with a camper body thereon;

Still another object of this invention is to provide means for rendering a camper-type vehicle safe in operation for those riding therein.

Another object of this invention is to provide additional stress bearing capacity for trucks;

Yet another object of this invention is to provide means for providing and improving the required stability for a camper vehicle, while at the same time avoiding structural fatigue for accompanying support parts.

Another object of this invention is to provide means for bearing and supporting the load of a camper mounted on the rear of a truck.

Still another object of this invention is to provide an improved frame support for trucks.

SUMMARY OF THE INVENTION

The subject invention is used on a truck, which may carry disproportionately distributed loads. The invention is a supplementary rectangular frame extension having wheels rotatably mounted thereon. The supplementary frame is fixed to the most rearward portion of the main truck frame as its only point of connection to the truck, with no connection between the supplementary frame and the load carried on the truck or the load-bearing surface of the truck. Mounted to the supplementary frame is an axle supporting wheels for rolling contact with the ground.

BRIEF DESCRIPTION OF THE DRAWINGS

FIG. 1 is a side elevational view of a truck, with a camper body disposed thereon, utilizing the subject invention;

FIG. 2 is a top elevational view of the supplementary frame extension used in the subject invention.

FIG. 3 is a perspective view of the supplementary frame extension showing the axle and wheels mounted thereto;

FIG. 4 is a perspective view of the supplementary frame extension showing an alternate modification thereto;

FIG. 5 is a detailed perspective and fragmentary view of the bracket connecting arrangement used to connect the supplementary frame extension with the main truck frame.

DESCRIPTION OF THE PREFERRED EMBODIMENT OF THE SUBJECT INVENTION

Referring now to the drawings in which a preferred embodiment of the invention is shown, a truck 10, of the conventional type having a cab 11 and body 12, is shown with a camper body 13 mounted on the horizontally disposed load-bearing portion 14 on the back of truck 10. The description of this preferred embodiment as relating to a truck with a camper body thereon shall not be construed to limit the scope of this invention to such specific vehicular application, but shall be presented as the most preferred embodiment and most expedient application of the inventive principles set forth therein.

The truck 10 has a horizontally disposed main body frame 16, shown in phantom in FIG. 1, which is disposed in a supporting fashion under the lower longitudinal extent of the body 12 of truck 10. Mounted to frame 16, is a front axle 20 and a rear axle 22, which support a pair of front wheels 24 and a pair of rear wheels 26, respectively.

Camper body 13 is basically L-shaped in configuration, as viewed from side elevation shown in FIG. 1, with the main portion thereof extending longitudinally from the cab 11 of truck 10 rearwardly beyond the rear horizontal limit of the load-bearing portion 14. Thus, as seen in FIG. 1, camper body 13 protrudes out beyond the rear limits of the load-bearing surface as much as three or four feet, depending on the structural details of the camper body. In addition, camper body 13 protrudes to a small extent over the sides of the load-bearing surface 14 of track 10. This positioning, shape, and relative size of the camper body 13 creates an instability condition, whereby the center of gravity, and thus the moment of inertia, for the truck 10 and camper 12 combination is shifted rearwardly on truck 10 to a substantial extent. The camper body 13 is representative of a typical unbalanced load on a truck for which this invention is directed.

Integrally fixed to the rear portion of truck frame 16 by semipermanent means is a horizontally disposed supplementary frame extension 30. Specifically, this supplementary frame extension 30 is non-pivotally fixed to the main truck frame 16 by a vertically extending bracket plate 32, disposed on each lateral side of frame 16. Each bracket plate 32 can be adapted to be bolted to frame 16, as a preferable connection. It is desirable to provide bracket plate 32 with a plurality of vertically arranged bolt holes so that the supplementary frame 30 is vertically adjustable relative to the main truck frame 16.

Frame extension 30 is rectangular and preferably slightly wider than the lateral extent of the main truck frame 16. Longitudinally, supplementary frame extension 30 extends from the rear extent of frame 16 to about the rear extent of the bottom-most portion of camper body 12, or preferably a foot beyond.

Furthermore, frame extension 30 has two parallel and longitudinally extending side rails 34 and 36 which extend in a direction parallel to the central longitudinal axis of the truck 10. In addition, frame extension 30 has two laterally extending rails 38 and 40, which are parallel to one another and connect the longitudinally extending rails 34 and 36 in a perpendicular relationship.

Serving as a truss-like brace between frame rails 36 and 38 is a rail support 42 which is connected to rail 36 so as to form an angle of approximately thirty degrees with rail 36; and it is connected to rail 38, forming with rail 38 an angle of about 60 degrees. Similarly, support rail 44 connects rails 34 and 38, support rail 46 connects rails 34 and 40, and support rail 48 connects rails 36 and 40. Additionally, laterally extending cross brace 50 provides further rigidity to the frame extension 30 by its connection between the mid-point of support rails 42 and 44. This specific construction for the supplementary frame extension is set forth by way of exemplification as a preferred structural arrangement, however, basically similar frame constructions will suffice for the purposes of this invention.

Rotatably mounted in a pair of bearing members 52A and 52B, fixed to frame extension 30, is an axle 54 which supports a pair of wheels 56A and 56B for rolling contact with the ground. Axle 54 is preferably a torison bar type axle, and is encircled by a pair of coil springs 58A and 58B at each end, the inwardly extending ends of which are fixed into a pair of keepers 60A and 60B on the axle 46.

There is no vertical support connection between the truck 10 or the camper body 13 and supplementary frame extention 30 except through the bracket plate 32 connection between the truck frame 16 and supplementary frame extension 30 as described above. Consequently, there are no direct connections between the truck body 12 itself or camper body 13 and the supplementary frame extension 30, with the resultant effect that no overstability problems are created. The overall effect is to yield a relatively smooth ride for the camper body 13 and truck 10.

Each bracket plate 32 is joined to a rectangular hollow guide, 62A and 62B respectively through intermediate channel members 64A and 64B, as shown in FIG. 5. The respective connecting plates 32 for each side of the frame 30 and their adjoining channel members, 62A and 64A, and 62B and 64B, respectively are joined together by a horizontally disposed supporting bar 66, which provides rigid support there between.

The hollow rectangular guides 62A and 62B are adapted to slide on the rear ends of side rails 34 and 36, which jut rearwardly beyond the connecting rail 38. These rectangular guides 62A and 62B in turn are locked to the respective ends of side rails 34 and 36 by locking pins 68A and 68B which are engaged through openings 70A and 70B in side rails 34 and 36. It can thus be seen that the frame extension 30 mounted serves not only as a weight bearer but also as a weight stabilizer for the camper-truck combination.

As an alternate embodiment to the supplementary frame 30, a rearwardly extending step plate 72 can be constructed on the rear of the frame extension 30, as seen in FIG. 4.

The foregoing description of the preferred embodiment of this invention is set forth for purposes of exemplification and shall not be construed to limit the scope of the claims set forth below.

I claim:

1. A stabilizing device for a truck with an underlying support frame and having a horizontally disposed load bearing surface, comprising:
 (a) a horizontally disposed supplementary frame extension to underlie said load bearing surface, said frame extension including:
  (1) a pair of mutually parallel longitudinal side rails each disposed in a direction parallel to the central longitudinal axis of the truck and a pair of mutually parallel lateral rails each extending in a direction perpendicular to the central longitudinal axis of the truck, said lateral and said longitudinal side rails being joined to one another at their respective ends so as to form a rectangle,
  (2) a plurality of diagonally disposed brace members each joined at its respective ends to an adjacent lateral and longitudinal side rail member of said frame extension,
  (3) a plurality of wheels rotatably mounted to said supplementary frame extension for rolling contact with the ground,
  (4) a pair of vertical bracket plates adapted to connect said longitudinal side rails to the rear extermity of said underlying support frame, and also adapted to position said side rails in a horizontal plane lower than the horizontal plane of the load-bearing surface, wherein said stabilizing device lies entirely below said load bearing surface.

2. A stabilizing device as described in claim 1 in which there is a horizontally disposed step plate connected to the rear extremity of said stabilizing device.

3. A stabilizing device as described in claim 1 in which the bracket plates connecting the stabilizing device are rectangular in shape.

4. A stabilizing device as described in claim 1 in which the stabilizing device is disposed in a horizontal plane lower than the horizontal plane of the truck support frame.

References Cited

UNITED STATES PATENTS

| | | | |
|---|---|---|---|
| 3,346,096 | 4/1969 | Rogge | 280—34 UX |
| 3,544,128 | 12/1970 | Storm | 280—81 A |
| 1,366,771 | 1/1921 | Devencenzi | 280—34 UX |

BENJAMIN HERSH, Primary Examiner

J. P. SILVERSTRIM, Assistant Examiner

U.S. Cl. X.R.

280—150 A; 296—28 R